Jan. 9, 1968   G. H. MYCROFT   3,362,373
AMPHIBIOUS STRUCTURE
Filed Sept. 19, 1966   3 Sheets-Sheet 1
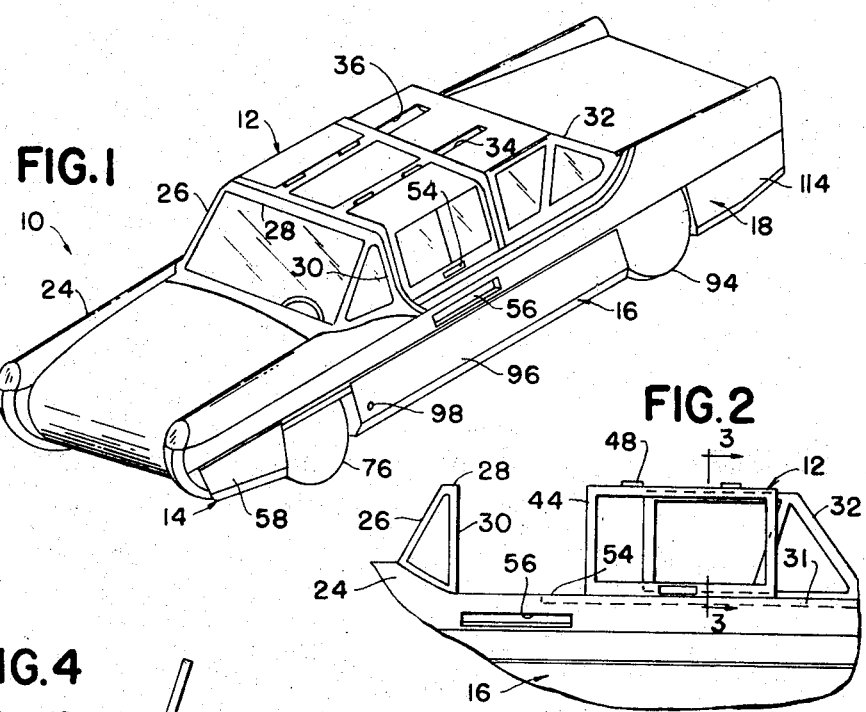
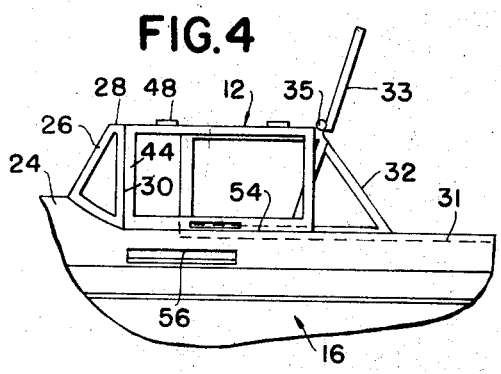
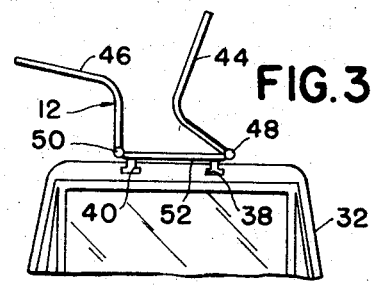
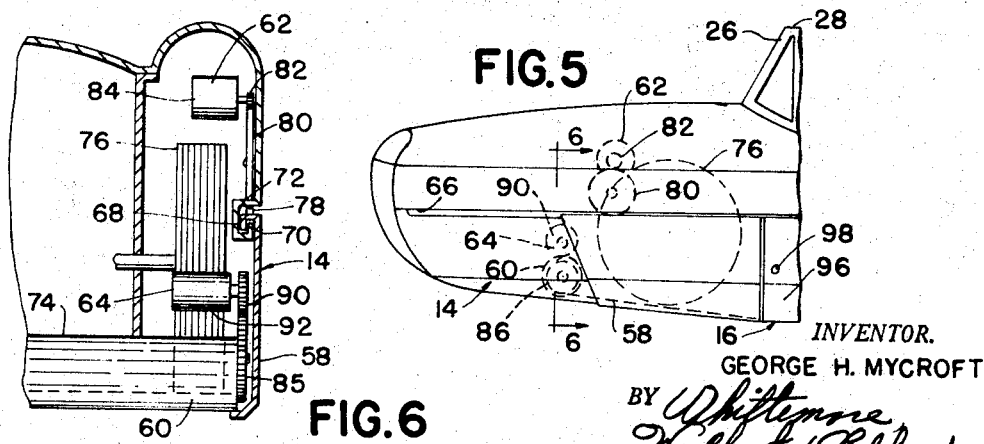
INVENTOR.
GEORGE H. MYCROFT
BY
ATTORNEYS Jan. 9, 1968   G. H. MYCROFT   3,362,373
AMPHIBIOUS STRUCTURE
Filed Sept. 19, 1966   3 Sheets-Sheet 2
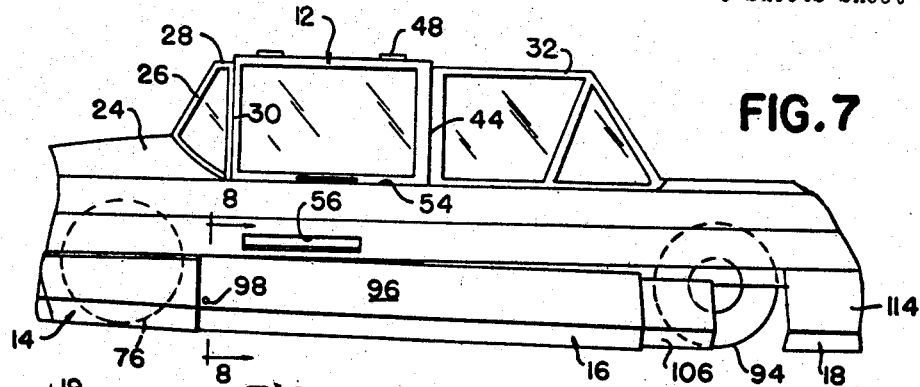
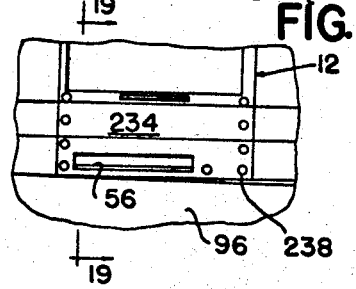
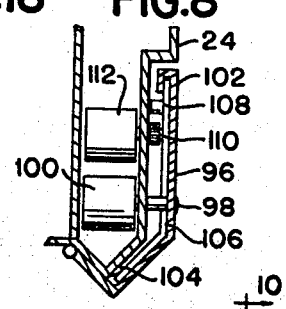
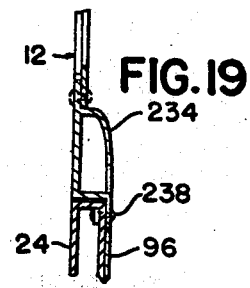
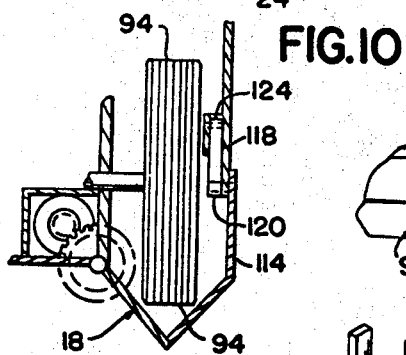
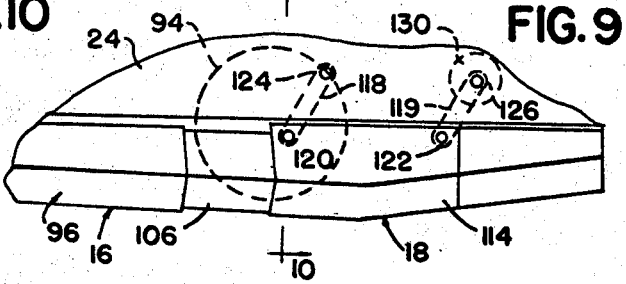
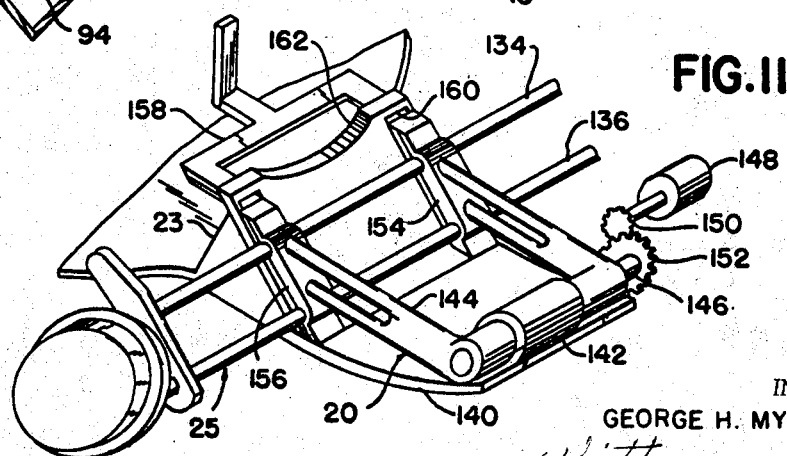
INVENTOR
GEORGE H. MYCROFT
BY *Whittemore,*
*Hulbert & Belknap*
ATTORNEYS Jan. 9, 1968            G. H. MYCROFT            3,362,373
AMPHIBIOUS STRUCTURE
Filed Sept. 19, 1966            3 Sheets-Sheet 3
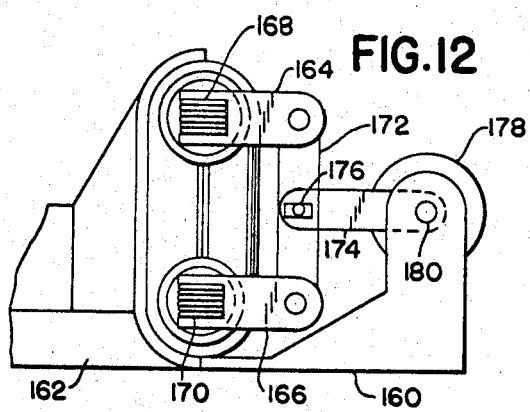
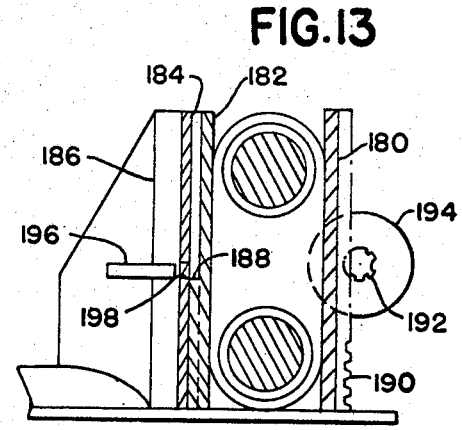
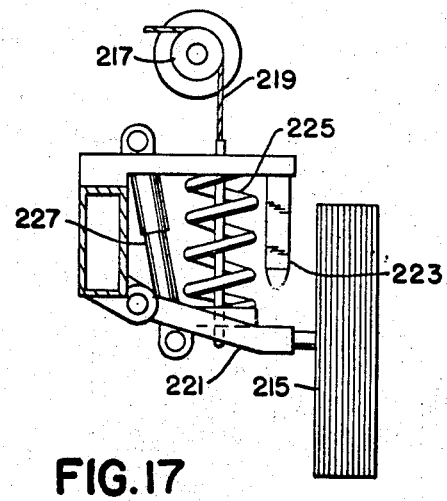
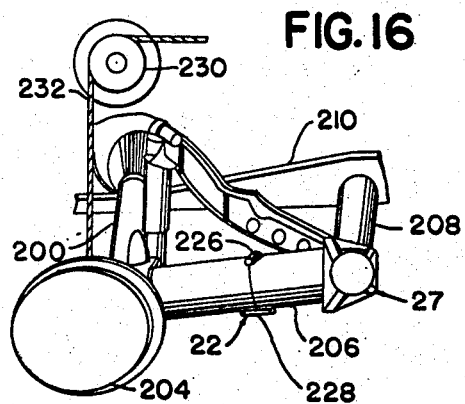
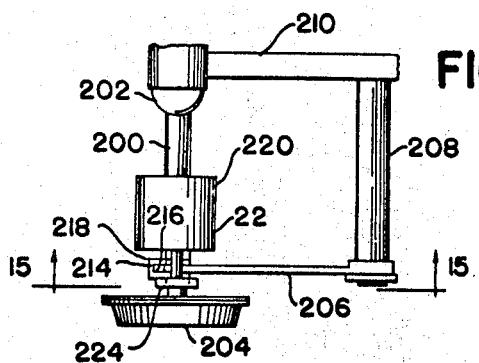
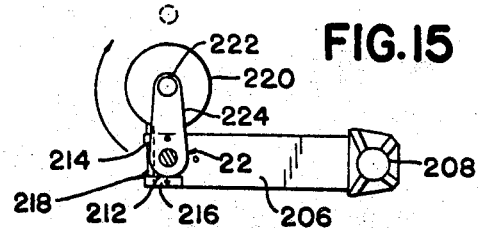
INVENTOR
GEORGE H. MYCROFT
BY *Whittemore,*
*Hulbert & Belknap*
ATTORNEYS

United States Patent Office 3,362,373
Patented Jan. 9, 1968

3,362,373
AMPHIBIOUS STRUCTURE
George H. Mycroft, 2309 Page Ave.,
Ann Arbor, Mich. 48104
Filed Sept. 19, 1966, Ser. No. 580,274
14 Claims. (Cl. 115—1)

ABSTRACT OF THE DISCLOSURE

The invention relates to amphibious structure and refers more specifically to a vehicle suitable for land travel as a family automobile and water travel as a pleasure boat, which structure is especially constructed for rapid transition between land and water travel. The special construction includes a plurality of means for retracting the wheels of the vehicle and special wheel fairing structure. The roof and door structure of the vehicle are particularly designed with a sliding canopy and a tilting portion and with a detachable section respectively to permit ease of entry into and use of the vehicle either for water or land travel.

---

This application is a continuation-in-part of my co-pending application Ser. No. 435,992, filed Mar. 1, 1965, now Patent No. 3,280,785, issued Oct. 25, 1966.

At present many people own both an automobile and a boat. The expense of owning both a boat and an automobile is a burden to most people. Further, most people do not use both the automobile and boat at the same time. Therefore, there is a need for a single amphibious structure to replace the land bound automobile and water bound boat. The amphibious structure would reduce the overall expense for travel on both land and water. Also, the necessity for crossing bodies of water at only predetermined points by means of rather expensive bridge structure and the requirement for separate land vehicles, such as boat trailers for moving boats to and from water would be eliminated. The expense of dock space would also be eliminated for the boater.

Amphibious structures have been provided in the past primarily for military use but occasionally as a civilian article of commerce. The amphibious structures of the past however have been unsuccessful in that particularly poor aesthetic appearance has prevented their acceptance by the public. In addition prior amphibious structures for civilian purposes have had poor hydraulic design so that the water flow therearound has produced undesirable operation of the amphibious structure as a boat.

It is therefore one of the objects of the present invention to provide an improved amphibious structure.

Another object is to provide an amphibious vehicle having improved roof and door structure.

Another object is to provide an amphibious vehicle including doors that open upward from both sides of a roof structure that may be moved longitudinally of the vehicle to completely remove the doors and roof over the front passenger area.

Another object is to provide an amphibious vehicle as set forth above the roof structure further includes window means pivotal about a horizontal axis transverse of the vehicle to provide a flying bridge effect.

Another object is to provide an amphibious vehicle as set forth above including a body and doors and portions adapted to be secured to the body in the summer and to the doors in the winter to provide a watertight structure in the summer and easy access in the winter.

Another object is to provide an amphibious vehicle including wheel fairing structure for covering the wheels of the vehicle during operation thereof as a boat to improve the water flow around the vehicle.

Another object is to provide wheel fairing structure as set forth above wherein at least some of the fairing members are rolled into a cylinder when not in use and may be unrolled into a wheel fairing position.

Another object is to provide wheel fairing structure as set forth above wherein at least some of the fairing members are pivoted at one end and are moved up and down at the other end out of and into wheel fairing position.

Another object is to provide wheel fairing structure as set forth above wherein at least some of the fairing members are supported on parallel links and are pivoted between a position wherein the wheels are uncovered for road operation of the vehicle and a position wherein the wheels are covered for water operation of the vehicle.

Another object is to provide an amphibious vehicle including structure for retracting the wheels of the vehicle during water operation of the vehicle.

Another object is to provide an amphibious vehicle including the front and rear wheel suspension structure of a 1965 Volkswagen automobile and the structure for retracting the front wheels includes means for moving the torsion bars of the wheel suspension structure upward through a predetermined arc and the rear wheels are retracted by means of hinging the wheel support member between the rear torsion bar and wheel and pivoting the wheel upward in a predetermined arc.

Another object is to provide an amphibious vehicle as set forth above wherein the front wheels are retracted by means of twisting the front torsion bars into a limiting position.

Another object is to provide an amphibious vehicle as set forth above wherein the front wheel suspension structure is mounted on a vertical track and rack and pinion means are provided to move the front wheel suspension up and down the track.

Another object is to provide an amphibious vehicle wherein the wheels are individually suspended and including means for separately retracting the wheels comprising structure for snubbing the wheel suspension structure against limiting bumpers therefor.

Another object is to provide amphibious vehicle structures which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a perspective view of amphibious vehicle structure constructed in accordance with the invention with the wheels down and the wheel fairings in position for land travel.

FIGURE 2 is an enlarged partial side elevation of the vehicle illustrated in FIGURE 1 showing the door and roof structure in a partially retracted position.

FIGURE 3 is a transverse section of the portion of the vehicle illustrated in FIGURE 2 taken substantially on the line 3—3 in FIGURE 2 with one door of the roof and door structure partly open and the other door fully open.

FIGURE 4 is an enlarged partial side elevation of the vehicle illustrated in FIGURE 1 showing the roof structure positioned to provide a flying bridge effect.

FIGURE 5 is an enlarged partial elevation view of the front portion of the amphibious vehicle illustrated in FIGURE 1 showing the left front wheel fairing in a position for water travel.

FIGURE 6 is an enlarged partial section view of the amphibious vehicle structure illustrated in FIGURE 5 taken substantially on the line 6—6 in FIGURE 5.

FIGURE 7 is an enlarged partial elevational view of the amphibious vehicle illustrated in FIGURE 1 showing the front fairing for the left rear wheel with the left rear wheel retracted and the fairing in position for water travel.

FIGURE 8 is an enlarged partial transverse cross section of the portion of the amphibious vehicle illustrated in FIGURE 7 taken substantially on the line 8—8 in FIGURE 7.

FIGURE 9 is an enlarged partial elevation view of the amphibious vehicle illustrated in FIGURE 1 showing the parallel link mounting means for the rear, rear left wheel fairing member with the wheel retracted and the fairing in position for water travel.

FIGURE 10 is an enlarged transverse cross section of the portion of the amphibious vehicle illustrated in FIGURE 9 taken substantially on the line 10—10 in FIGURE 9.

FIGURE 11 is an enlarged perspective view of front wheel retracting mechanism for the amphibious vehicle illustrated in FIGURE 1.

FIGURE 12 is an enlarged section view of modified structure for retracting the front wheels of the amphibious vehicle illustrated in FIGURE 1.

FIGURE 13 is another modification of the structure for retracting the front wheels of the amphibious vehicle illustrated in FIGURE 1.

FIGURE 14 is an enlarged plan view of a portion of the rear wheel suspension of the vehicle illustrated in FIGURE 1 showing the rear wheel retraction structure therefor.

FIGURE 15 is a partial section view of the rear wheel suspension and retraction structure illustrated in FIGURE 14 taken on the line 15—15 in FIGURE 14.

FIGURE 16 is an enlarged perspective view of modified rear wheel retracting mechanism for the amphibious vehicle illustrated in FIGURE 1.

FIGURE 17 is an elevation view of structure for retracting individually suspended vehicle wheels in amphibious vehicle structure, such as that illustrated in FIGURE 1.

FIGURE 18 is a partial elevation view of a modification of the amphibious vehicle illustrated in FIGURE 1.

FIGURE 19 is an enlarged cross section view of the modified vehicle structure illustrated in FIGURE 18 taken substantially on the line 19—19 in FIGURE 18.

With particular reference to the figures of the drawing, one embodiment of the present invention will now be considered in detail.

The amphibious vehicle 10, illustrated in FIGURE 1, includes a roof and door structure 12 in which the doors and rear window swing up, as illustrated in FIGURES 3 and 4, and which has front and rear portions which slide longitudinally of the vehicle 10, as shown in FIGURES 2 and 4, to permit easy entry into and exit from the vehicle 10 and provide a flying bridge effect. Vehicle 10 further includes the front wheel fairing structure 14 and the front and rear, rear wheel fairing structure 16 and 18 respectively. Further, front and rear wheel retracting structures 20 and 22 are provided for the amphibious vehicle 10.

In operation of the amphibious vehicle 10 the door and roof structure 12 may be opened to permit entry of a passenger into the vehicle 10. The amphibious vehicle 10 may be driven from the land into water and is constructed to float with the bottom of the roof and door structure 12 above the water line thereof. With the vehicle 10 in the water the wheel fairing structures 14, 16 and 18 are caused to enclose the vehicle wheels, as shown in FIGURES 4 and 9, to provide smooth flow of water around the amphibious vehicle 10. Before the wheel fairing structures 14, 16 and 18 are moved to cover the vehicle wheels the vehicle wheels are retracted as by means of the wheel retracting structures 20 and 22 illustrated in FIGURES 11 and 14. When water travel has been completed the wheel fairing structures 14, 16 and 18 are returned to the position thereof illustrated in FIGURE 1, the wheels are put down and the amphibious vehicle 10 may be driven on land.

Thus, the amphibious vehicle 10, as illustrated in FIGURE 1, provides convenient inexpensive and comfortable travel on both land and water with the transition therebetween being extremely simple.

More specifically the amphibious vehicle 10, as shown in FIGURE 1, is constructed on the chassis 23 and with the front and rear wheel suspensions 25 and 27 of the Volkswagen automobile of, for example the 1965 model. The volkswagen body will not be used and a body constructed of suitable material such as light metal or fiberglass 24 will be substituted therefor. The body 24, as shown in FIGURE 1, includes a windshield structure 26 having the top supporting bar 28 and the side supporting bars 30.

The sliding roof portion 32 is mounted for front and rear sliding movement of the vehicle 10 in tracks 31 set in the body member at the sides of the passenger compartment. The rear window 33 of the sliding roof portion 32 is mounted for pivotal movement about a transverse pivot axis 35. Thus with the roof portion 32 forward and the window 33 pivoted up, a flying bridge is provided for the vehicle 10 as shown in FIGURE 4.

The roof portion 32 of the body 24 is provided with a pair of parallel recesses 34 and 36 therein extending longitudinally of vehicle 10 and having an inverted T-shaped cross section, as illustrated best in FIGURE 3. The roof and door structure 12 of the amphibious vehicle 10 is of a dimension to slide over the roof portion 32, as shown in FIGURE 2. The roof and door structure 12 includes downwardly extending inverted T-shaped guides 38 and 40 extending into the recesses 34 and 36. The inverted T-shaped guides 38 and 40 permit guided movement of the roof and door structure 12 of the amphibious vehicle 10 longitudinally of the vehicle.

As shown best in FIGURE 3, the doors 44 and 46 are hinged at 48 and 50 respectively and may be raised upwardly after being unlatched. Required sealing and latching mechanism, well known in the automotive art, are provided around the perpihery of the roof and door structure 12. Locking means are also provided for securing the roof and door structure 12 in a closed position and for separately securing each of the doors 44 and 46 in a closed locked position.

The doors 44 and 46, as shown in FIGURE 3, are capable of folding back over the central portion 52 of the roof and door structure 12 to permit standing in the vehicle 10. Thus on entering the vehicle 10, one of the doors, for example door 44, is raised and folded back over the central portion 52 of the roof and door structure 12, as shown in FIGURE 3. The passenger may then step over the window sill 54 into the vehicle 10, after which the passenger may be seated. If desired a step 56 may be recessed into the side of the body 24, as illustrated in FIGURE 1, to provide two-step entry into the vehicle 10 on land. With the vehicle 10 in water a passenger will normally be required to step down from a dock or the like into the vehicle 10 with the door and top structure 12 moved longitudinally into a rearward position or with one of the doors 44 or 46 open.

The front wheel fairing structure 14, as best shown in FIGURES 5 and 6, includes an outer fairing member 58 and an inner fairing member 60 which is a flexible metal screen or the like. Mechanism 62 is provided for moving the outer fairing member 58 longitudinally of the amphibious vehicle 10 while structure 64 is provided to unroll the inner fairing member 60 and move it longitudinally of the vehicle.

A recess 66 is provided in the body member 24 at the top of the outer fairing member 58 in which the plastic bearing plates 68 and 70 are positioned. The outer fairing member includes the open returned flange 72 positioned between the bearing plates 68 and 70.

Thus, in operation on land the outer fairing member 58 is in a forward position, as shown in FIGURE 1, and the inner fairing member 60 is rolled up in a horizontal, transverse position at the front of wheels 76 adjacent the vehicle bottom 74. During operation of the vehicle 10 in the water the front wheel outer fairing member 58 is caused to move rearwardly by the structure 62 and the inner fairing member 60 is caused to unroll and move forward the rear of the vehicle into the positions illustrated in FIGURES 4 and 5. The retracted vehicle front wheel 76 is thus enclosed by fairing members 58 and 60 to provide smooth water flow therearound.

The structure 62 for automatically moving the outer fairing member 58 longitudinally of the vehicle 10 includes a rack 78 on the top of the outer fairing member 58, a gear 80 in mesh with the rack 78, a pinion 82 in mesh with the gear 80 and a motor 84 connected for driving the pinion 82 on energization thereof. The structure 64 for unrolling and moving the inner fairing member 60 into the position shown in FIGURES 5 and 6 comprises the gear 86 secured to the inner fairing member 60 for rotation therewith to roll up and unroll the fairing member 60 and pinion 90 in mesh with the gear 86 and driven on actuation of motor 92. The motors 84 and 92 may be energized from the interior of the amphibious vehicle 10 by an electric switch or the like. Convenient mounting means for the gears 80 and 86, pinions 82 and 90 and motors 84 and 92 are provided as needed. A single multiple drive motor may be used in place of the two motors 84 and 92 illustrated in FIGURE 5, if desired.

The outer front fairing member 96 for the left rear wheel 94 is pivoted to the body 24 by pivot means 98 and may be driven in either a clockwise direction or a counterclockwise direction by the motor 100 connected to the pivot means 98. The outer fairing member 96 includes open returned longitudinal sides 102 and 104 slidingly holding the rear wheel fairing member 106 therein. The rear wheel fairing member 106 is provided with a rack 108 thereon extending longitudinally thereof adapted to engage the pinion 110 with the fairing member 96 in a lowermost position. The pinion 110 may be rotated by motor 112 to slide the fairing member 106 longitudinally of the outer fairing member 96.

Thus when water operation of the amphibious vehicle 10 is desired the motor 100 is energized to rotate the outer fairing member 96 clockwise into the position shown in FIGURE 7. The rack 108 engages the pinion 110 at this time and motor 112 is energized. The fairing member 106 is then moved rearwardly of the vehicle 10 into the position illustrated in FIGURE 7 wherein it encloses the forward portion of the rear vehicle wheel 94.

The enclosure of the outside of the rear wheel 94 in a retracted position may be completed with the outer rear fairing member 114 of fairing structure 18.

The fairing member 114 is supported on two parallel links 118 and 119 for movement between two uppermost positions. The lower ends 120 and 122 of the parallel links 118 and 119 are pivotally connected to the rear wheel fairing member 114. The upper end 124 of the front parallel link is pivotally mounted in a fixed position on body 24 while the upper end 126 of the rear parallel link 119 is connected to the motor 130. Thus, in operation the motor 130 is actuated to rotate the parallel links counterclockwise to move the fairing member 114 into the position shown in FIGURE 1 and to rotate the links into the extreme clockwise position shown in FIGURE 9 to cover the rear part of the vehicle wheel with the fairing member 114.

An inner fairing member similar to and actuated in the same manner as the inner fairing member 60 in conjunction with the front wheel 76 is provided in conjunction with the fairing members 96 and 106 and fairing member 114 to complete the enclosure of the rear wheels 94.

Retraction of the front wheels 76 of the amphibious vehicle 10 for water operation and lowering of the wheels 76 for land operation is according to the invention accomplished by structure 20 illustrated best in FIGURE 11. FIGURE 11 illustrates the torsion bars 134 and 136 of the front wheel suspension system 25 and chassis 23 of a standard 1965 Volkswagen. The torsion bars 134 and 136 are in the usual Volkswagen construction bolted to the chassis 23 and are rigidly maintained in such position.

In accordance with the present invention the chassis 23 has been extended to provide the pivot mount 140 having the pivot hinge portion 142 secured thereto. The wheel retraction lever arms 144 are pivotally mounted in the hinge portion 142 for rotation with the shaft 146 on the motor 142 being energized due to meshing of the pinion 150 driven by the motor 148 and the gear 152 in driving relation to the shaft 146. The lever arms 144 rigidly hold the torsion bars 134 and 136 in brackets 154 and 156. A locking bar 158 extends through the openings 160 in the mounting plate 162 to lock the front wheel suspension torsion bars 134 and 136 in a fixed down position. Mounting plate 162 is secured to chassis 23 in a fixed position.

Thus, in operation when it is desired to retract the front wheels 76, the locking bar 158 is withdrawn from the openings 160 in the mounting plate 162 by convenient mechanical or automatic electric means. The motor 148 is then actuated to rotate the lever arms 144 clockwise. The wheels 76 are thus moved into an uppermost position therefor. Suitable linkage may be provided to permit arcuate movement of the usual Volkswagen road steering mechanism if desired. Alternatively the road steering mechanism could be redesigned to disconnect on movement of the torsion bars 134 and 136 into a retracted position and to reconnect on pivoting the lever arms 144 in a counterclockwise direction to lower the wheels 76 into a locked, land travel position.

As indicated diagrammatically in FIGURE 12, the front wheels of the amphibious vehicle 10 may be retracted by structure other than structure 20. Thus, for example, the mounting bracket 160 may be added to the front of the usual Volkswagen chassis 162. The parallel levers 164 and 166 are rigidly attached at one end to the torsion bars 168 and 170 of the usual Volkswagen front wheel suspension and are connected together by the link 172 pivotally connected thereto at the opposite ends thereof. The third lever 174 is connected for rotation with the shaft 180 on energization of motor 178. The lever 174 is further connected to the link 172 at the outer end thereof by the lost motion connection 176. Thus, on actuation of the motor 178 torsion may be applied to the torsion bars 168 and 170 to place the front wheels of the vehicle 10 in a limiting upward position. The wheels will thus be retracted by limit operation of the usual front wheel suspension system.

Still another modification of the structure for retracting the front wheels of the amphibious vehicle 10 is illustrated in FIGURE 13. Thus in FIGURE 13 a front and rear mounting plate 180 and 182 are provided to which the torsion bars of the front suspension of the amphibious vehicle structure 10 are secured. A track 184 is provided on the front of the vehicle chassis and a slide 188 is provided on the rear mounting plate 182 movable vertically in the track 184. A rack 190 is provided on the front mounting plate 180 and is engaged by the pinion 192 rotated on actuation of motor 194 to move the front wheel suspension of the vehicle in up and down directions. Suitable means, such as a sliding lock 196 adapted to extend through an opening 198 in the track 184 may be provided to lock the vehicle suspension system in a down position.

The rear wheels 94 of the vehicle 10 like the rear wheels of the Volkswagen are independently suspended as illustrated in FIGURES 14 and 15. Thus, the axle 200 is supported at one end by the universal joint 202 for movement defining a portion of a core having the apex at the universal joint 202. The wheel drum 204 to which a wheel 94 is secured is maintained in a resiliently supported road travel position by the flat spring support member 206 rigidly secured at one end to the torsion bar 208 which in turn is attached to the vehicle frame 210. The axle 200 is secured in a fixed position in the recess 212 in the end of the spring support member 206 by the removable locking member 214 slidable vertically in slots 216 in the members 218 rigidly secured to the spring 206.

Thus, in operation with the locking member 214 in the position illustrated in FIGURES 14 and 15, resilient mounting of the wheel drum 204 is accomplished in the usual manner. Road shock is absorbed as a combined function of the torsion longitudinally of the vehicle on the torsion bar 208 and transversely of the vehicle on the leaf spring 206.

With the vehicle 10 in the water the locking member 214 is withdrawn from the members 218 and the motor 220 which may be supported from the vehicle frame by suitable resilient or lost motion connections (not shown) is rotated clockwise, as illustrated in FIGURE 15, whereby the axle 200 secured to the motor drive shaft 222 by the connecting link 224 is caused to describe half of the surface of a cone having its apex at the universal joint 202 and to thus provide raising of the rear wheels 94. Synchronizing the movement of the locking member 214 and actuation of the motor 220 may be accomplished either manually or automatically in a known manner.

Alternatively, as shown in FIGURE 16, the support member 206 can be split vertically and a hinge 226 provided on the top thereof cooperating with a toggle clamp 228 secured to the bottom of the support member extending over the split therein. Thus, in conjunction with a cable 232 and motor means 230 for winding the cable up or passing out the cable attached to the wheel drum 200, the drum 200 may be retracted for water travel with the toggle clamp loose. Road travel may be accomplished with the toggle clamp closed and the cable extended.

In a similar manner with other vehicles which, for example, may have individual suspension, as shown in FIGURE 17, the wheels 215 may be retracted by means of a suitable mechanical crank 217 operating on the cable 219 to snub the A-frame 221 against the bumpers 223 at the end of the travel allowed by the suspension spring 225 and shock absorber 227.

To provide easier entry into the vehicle 10 in the winter when water travel is not normally required, portions 234 of the body 24 may be separate from the rest of the body so that they may be secured to the door and roof structure 12 in the winter by means, such as the bolts 240, shown in phantom in FIGURE 19. The body portions 234 will thus open and close with the doors in the winter. The portions 234 of the body 24 will in the usual case, although not necessarily, prevent sliding of the roof and door structure 12 over the fixed portion 32 of the roof of the vehicle 10. This will not however be objectionable under winter driving conditions. In the summer when travel is desired, the portions 234 of the body 24 are secured to the body 24 by bolts 238 in a watertight connection.

Several drive systems suitable for combined land and water use in amphibious vehicles are well known and form no part of the present invention. They will not therefore be considered in detail herein. It is obvious that some such drive system for operation of the disclosed vehicle alternatively on either land or water is necessary. Similarly the steering mechanism for both land and water vehicles are well known and are not part of the present invention. They will likewise not be considered in detail herein.

While one embodiment of the present invention and modifications thereof have been considered in detail, it will be understood that other embodiments and modifications are contemplated. For example, a single hydraulic motor may be used to actuate all the fairing and retraction structures to ready the vehicle for either land or water travel in place of the individual electric motor specifically disclosed. It is the intention to include all embodiments and modifications as are defined by the appended claims within the scope of the invention.

What I claim as my invention is:

1. Structure for retracting a wheel of a vehicle including a chassis and a pair of torsion bars supporting the wheel comprising a pair of lever members rigidly secured to the torsion bars at one end thereof for stressing the torsion bars in one direction on pivotal movement of the lever members in one direction about the torsion bars, a connecting link between the other ends of the lever members pivotally connected thereto, a bracket secured to the chassis of the vehicle, a motor secured adjacent to the bracket, a shaft connected to the motor for rotation thereby, a third lever one end of which is rigidly connected to the shaft for rotation therewith about the axis of the shaft and a lost motion connection between the other end of the third lever and the connecting link.

2. Structure for retracting a wheel of a vehicle including a chassis and a bar supporting the wheel comprising a front and rear mounting plate secured to the bar, a track secured to the front of the chassis of the vehicle, a slide movable verticaly in said track secured to the rear mounting plate, a rack secured to the front mounting plate, a pinion engaged with said rack, means for rotating the pinion and means for locking the rear mounting plate in a down position.

3. Structure for retracting the wheel of a vehicle individually suspended at one end of an axle universally mounted at the other end from one end of a torsion bar through a wheel supporting member extending between the end of the torsion bar and wheel comprising locking means for releasably securing the axle to the wheel supporting member, and means for rotating the one end of the axle upwardly through an arcuate path on releasing the locking means.

4. Structure for retracting separately suspended vehicle wheels suspended from the chassis of the vehicle by means of an A-frame pivotally mounted on the chassis frame wherein the vehicle includes a resilient bumper for and a coil spring positioned between the chassis and A-limiting the movement of the wheel suspension comprising a cable extending axially of the spring through the spring and secured to the A-frame and means secured to the chassis for moving the cable upwardly through the spring to pivot the A-frame into a fixed position against the resilient bumper therefor.

5. Wheel fairing structure for fairing a wheel in a retracted position comprising a track positioned over the wheel, an outer fairing member slidably positioned on said track and movable longitudinally thereof into and out of a wheel fairing position, means for sliding the outer wheel fairing into and out of a wheel fairing position, an inner wheel fairing member mounted for rolling movement about an axis transverse to the track into and out of a wheel fairing position and means for moving the inner wheel fairing member into and out of a wheel fairing position.

6. Wheel fairing structure for fairing a wheel in a retracted position comprising an outer fairing member positioned immediately in front of the wheel, means pivotally mounting the one end of the outer fairing member remote from the wheel, means for pivoting the outer fairing member about the pivot mounting thereof into and out of a wheel fairing position, another wheel fairing member telescoped within the other end of the outer wheel fairing member adjacent the rear wheel, means for moving the other wheel fairing member outwardly of the other end of the outer wheel fairing member into a wheel fairing position with respect to the wheel only when the outer wheel fairing member is in a wheel fairing position, an inner wheel fairing member pivotally mounted for pivotal movement about an axis parallel to the outer wheel fairing member into and out of a wheel fairing position and means for pivoting the inner wheel fairing member into and out of a wheel fairing position.

7. Wheel fairing structure for fairing a wheel in a retracted position comprising an outer fairing member supported on a pair of spaced apart parallel links which are pivotally mounted in a fixed position at one end and are pivotally mounted to the outer wheel fairing member at the other end and which are operable on pivotal movement to move the outer wheel fairing member into a pair of limiting upper positions into and out of fairing relation to the wheel and motor means connected to one end of one of the parallel links for pivoting the parallel links between the limiting positions.

8. In an amphibious vehicle having a body and wheel suspension structure, wheels secured to the wheel suspension structure including at least one front wheel, means for retracting the wheels of the vehicle and wheel fairing structure for fairing each of the wheels with the body of the vehicle in a retracted position to provide optimum water flow around the body and wheels of the vehicle during water travel, the wheel fairing structure for the front wheel comprising a track on the vehicle body forward of the front wheel, an outer fairing member slidably positioned on said track and movable longitudinally thereof into and out of a wheel fairing position, means for sliding the outer wheel fairing into a wheel fairing position, an inner wheel fairing member, means mounting the inner wheel fairing member on the vehicle for rolling movement about an axis extending transversely of the vehicle into and out of a wheel fairing position and means for moving the inner wheel fairing member into and out of a wheel fairing position.

9. In an amphibious vehicle having a body and wheel suspension structure, wheels secured to the wheel suspension structure including at least one rear wheel, means for retracting the wheels of the vehicle and wheel fairing structure for fairing each of the wheels with the body of the vehicle in a retracted position to provide optimum water flow around the body and wheels of the vehicle during water travel, the wheel fairing structure for the rear wheel comprising an outer fairing member extending longitudinally of the vehicle immediately in front of the rear wheel, means pivotally mounting the one end of the outer fairing member remote from the rear wheel, means for pivoting the outer fairing member about the pivot mounting thereof into and out of a rear wheel fairing position, another wheel fairing member telescoped within the other end of the outer wheel fairing member adjacent the rear wheel, means for moving the other wheel fairing member outwardly of the other end of the outer wheel fairing member into a wheel fairing position with respect to the rear wheel only when the outer wheel fairing member is in a wheel fairing position, an inner wheel fairing member, means pivotally mounting the inner wheel fairing member on the vehicle for pivotal movement about an axis extending longitudinally of the vehicle into and out of a wheel fairing position and means for pivoting the inner wheel fairing member into and out of a wheel fairing position.

10. In an amphibious vehicle having a body and wheel suspension structure, wheels secured to the wheel suspension structure including at least one rear wheel, means for retracting the wheels of the vehicle and wheel fairing structure for fairing each of the wheels with the body of the vehicle in a retracted position to provide optimum water flow around the body and wheels of the vehicle during water travel, the wheel fairing structure for the rear wheel comprising an outer fairing member supported from the vehicle body on a pair of spaced apart parallel links which are pivoted to the body at one end and to the rear wheel outer fairing member at the other end and which are operable on pivotal movement thereof to move the rear wheel fairing member into limiting upper positions in and out of fairing relation to the retracted rear wheel and motor means connected to one end of one of the parallel links for pivoting the parallel links between the limiting positions.

11. In an amphibious vehicle having a body and wheel suspension structure, wheels secured to the wheel suspension structure including at least one front wheel and a front wheel suspension, including a bar, means for retracting the wheels of the vehicle including pivot means secured to the chassis of the vehicle, a lever arm pivotally mounted on the pivot means, means for rigidly securing the bar of the front wheel suspension to the lever arm, means for pivoting the lever arm about the pivot means in opposite directions and means for locking the lever arm in a fixed position with the front wheel down for retracting the front wheel and wheel fairing structure for fairing each of the wheels with the body of the vehicle in a retracted position to provide optimum water flow around the body and wheels of the vehicle during water travel.

12. In an amphibious vehicle having a body and wheel suspension structure, wheels secured to the wheel suspension structure including at least one front wheel, the suspension for which include a pair of torsion bars extending transversely of the vehicle operable when stressed in one direction to retract the front wheel, means for retracting the wheels of the vehicle including a pair of lever members rigidly secured to the torsion bars at one end thereof for stressing the torsion bars in said one direction on pivotal movement of the lever members in one direction about the torsion bars, a connecting link between the other ends of the lever members pivotally connected thereto, a bracket secured to the chassis of the vehicle, a motor secured adjacent to the bracket, a shaft connected to the motor for rotation thereby, a third lever member one end of which is rigidly connected to the shaft for rotation therewith about the axis of the shaft and a lost motion connection between the other end of the third lever and connecting link for retracting the one front wheel and wheel fairing structure for fairing each of the wheels with the body of the vehicle in a retracted position to provide optimum water flow around the body and wheels of the vehicle during water travel.

13. In an amphibious vehicle having a body and wheel suspension structure, wheels secured to the wheel suspension structure including at least one front wheel, the suspension for which includes a bar extending transversely of the vehicle, means for retracting the wheels of the vehicle, including a front and rear mounting plate secured to the bar, a track secured to the front of the chassis of the vehicle, a slide movable vertically in said track secured to the rear mounting plate, a rack secured to the front mounting plate and pinion means engaged with said rack, means for rotating the pinion in opposite directions and means for locking the front wheel suspension in a down position for retracting the front wheel and wheel fairing structure for fairing each of the wheels with the body of the vehicle in a retracted position to provide optimum water flow around the body and wheels of the vehicle during water travel.

14. In an amphibious vehicle having a body and wheel suspension structure, wheels secured to the wheel suspension structure, including at least one rear wheel suspended from the end of a torsion bar by a wheel supporting member extending between the end of the torsion bar and the wheel, means for retracting the wheels of the vehicle, including a hinge on the upper side of the wheel supporting member at a break therein, a toggle clamp on the underside of the wheel supporting member at the break therein, cable means secured to the wheel and means for winding the cable up to raise the wheel to retract the rear wheel and wheel fairing structure for fairing each of the wheels with the body of the vehicle in a retracted position to provide optimum flow around the body and wheels of the vehicle during water travel.

References Cited

UNITED STATES PATENTS

| | | | |
|---|---|---|---|
| 3,280,785 | 10/1966 | Mycroft | 115—1 |
| 2,278,910 | 4/1942 | Bertran | 244—102 |

ANDREW H. FARRELL, *Primary Examiner.*